United States Patent
Wachsmann et al.

(10) Patent No.: US 9,991,982 B2
(45) Date of Patent: Jun. 5, 2018

(54) INTERFERENCE CANCELLATION IN A CELLULAR COMMUNICATION NETWORK

(71) Applicant: Telefonaktiebolaget L M Ericsson (publ), Stockholm (SE)

(72) Inventors: Udo Wachsmann, Schwabach (DE); Rainer Bachl, Nürnberg (DE); Stefan Mueller-Weinfurtner, Nürnberg (DE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 124 days.

(21) Appl. No.: 14/760,728

(22) PCT Filed: Jan. 21, 2013

(86) PCT No.: PCT/EP2013/051028
§ 371 (c)(1),
(2) Date: Jul. 14, 2015

(87) PCT Pub. No.: WO2014/111165
PCT Pub. Date: Jul. 24, 2014

(65) Prior Publication Data
US 2015/0358101 A1 Dec. 10, 2015

(51) Int. Cl.
*H04J 11/00* (2006.01)
*H04W 72/04* (2009.01)
*H04L 5/00* (2006.01)

(52) U.S. Cl.
CPC ....... *H04J 11/0036* (2013.01); *H04J 11/0059* (2013.01); *H04L 5/0007* (2013.01);
(Continued)

(58) Field of Classification Search
CPC . H04J 11/0036; H04J 11/0059; H04L 5/0007; H04L 5/0073; H04W 72/042
See application file for complete search history.

(56) References Cited

U.S. PATENT DOCUMENTS

| | | |
|---|---|---|
| 2010/0105404 A1 | 4/2010 | Palanki et al. |
| 2013/0005269 A1 | 1/2013 | Lindoff et al. |

(Continued)

FOREIGN PATENT DOCUMENTS

EP 2333983 A1 6/2011

OTHER PUBLICATIONS

New Postcom, "Remaining details of search space design for EPDCCH", 3GPP TSG RAN WG1 Meeting #71, New Orleans, USA, Nov. 12, 2012, pp. 1-6, R1-124795, 3GPP.
(Continued)

*Primary Examiner* — Ian N Moore
*Assistant Examiner* — Ronald H Davis
(74) *Attorney, Agent, or Firm* — Sage Patent Group

(57) ABSTRACT

A technique for cancelling inter-cell or intra-cell interference in a cellular communication network is described. A method implementation of that technique performed in an interfered terminal comprises receiving a signal, wherein the received signal comprises an interfering signal destined to at least one further terminal different from the interfered terminal. In a next step, control information pertaining to the at least one further terminal is determined and the interfering signal is decoded based on the control information so as to generate decoded information. Then, the interfering signal is re-generated from the decoded information and the control information. Based on the re-generated signal the interfering signal is cancelled from the received signal.

14 Claims, 5 Drawing Sheets

(52) U.S. Cl.
CPC ......... *H04L 5/0073* (2013.01); *H04W 72/042* (2013.01); *H04J 2211/005* (2013.01)

(56) References Cited

U.S. PATENT DOCUMENTS

| | | | | |
|---|---|---|---|---|
| 2013/0294398 | A1* | 11/2013 | Tujkovic | H04W 72/082 370/330 |
| 2014/0140317 | A1* | 5/2014 | Mobasher | H04B 7/024 370/330 |
| 2016/0029321 | A1* | 1/2016 | Hwang | H04J 11/005 455/450 |
| 2017/0310442 | A1* | 10/2017 | Noh | H04B 7/0613 |

OTHER PUBLICATIONS

LG Electronics Inc., "Allocation os a "short" CRNTI in msg2", 3GPP TSG-RAN WG2 #61bis, Shenzhen, CN, Mar. 31, 2008, pp. 1-2, R2-081517, 3GPP.

* cited by examiner

INTERFERENCE CANCELLATION IN A CELLULAR COMMUNICATION NETWORK

TECHNICAL FIELD

The present disclosure generally relates to the technical field of cellular communication networks. In particular, a technique for cancelling inter-cell or intra-cell interference is presented. The technique may be implemented in the form of a method, a device (such as a terminal or a network node) or a computer program product.

BACKGROUND

In cellular communication networks intra-cell and inter-cell interference limits the achievable data throughput. Intra-cell interference can occur among multiple terminals served in the same cell. Inter-cell interference, on the other hand, denotes interference among two or more cells. Inter-cell interference is often experienced by terminals at cell edges.

In order to increase the cell throughput, for example at a cell edge, terminals may apply interference cancellation techniques. Interference cancellation techniques target at cancelling the interference from a received signal and are implemented in the form of one or multiple interference cancellation stages. After the interference has been cancelled from the received signal, the remaining signal actually destined to the terminal ("desired signal") can be efficiently processed downstream of the interference cancellation stage(s). Such processing typically includes decoding operations.

It is evident that the quality of the decoding result strongly depends on the efficiency of interference cancellation. Efficient interference cancellation results in a higher decoding quality, which means that signals at lower signal levels (e.g., at cell edges) can still be successfully decoded.

SUMMARY

There is a need for a technique that permits to efficiently cancel inter-cell or intra-cell interference.

According to a first aspect, a method of cancelling inter-cell or intra-cell interference in a cellular communication network is provided, wherein the method is performed in an interfered terminal and comprises receiving a signal, wherein the received signal comprises an interfering signal destined to at least one further terminal different from the interfered terminal, determining control information pertaining to the at least one further terminal, decoding the interfering signal based on the control information so as to generate decoded information, re-generating the interfering signal from the decoded information and based on the control information, and cancelling the interfering signal from the received signal based on the re-generated signal.

The control information pertaining to the one or more further terminals may be determined in various ways. As an example, determining the control information may comprise receiving a control channel message including at least a part of the control information. The control channel message may be one of a Downlink Control Information (DCI) message and a Radio Resource Control (RRC) message. The control channel message may in one implementation be sent on a Physical Downlink Control Channel (PDCCH).

The control channel message may be a dedicated message. Specifically, the control channel message may be dedicated to the interfered terminal. In one implementation, the dedicated control channel message includes a subset of bits used to encode a cell-specific temporal identifier of the at least one further terminal. In such a case, the control information may be determined taking into account the subset of bits.

Alternatively, the control channel message may be a common message destined to multiple terminals (optionally including the interfered terminal and/or the at least one further terminal). In such a case, the control channel message may comprise a dedicated cell-specific temporal terminal identifier or any other identifier that identifies the control channel message as including at least a part of the control information.

Generally, the common control channel message may signal one or more of the following control parameters: a set of one or more cell-specific terminal identifiers of potentially interfering terminals, a common transmission mode for a set of one or more terminals, a common transmission format for a set of one or more terminals, and a common aggregation level for a set of one or more terminals.

At least a part of the control information may be determined based on a priori knowledge available to the interfered terminal. Such a priori knowledge of the interfered terminal may be pre-configured (e.g., in an applicable standard document) or may have been provided to the interfered terminal by a network node (e.g., initially upon attaching to the cellular communication network or starting a communication session).

The a priori knowledge may be exploited in various ways. As an example, determining the control information pertaining to the at least one further terminal may comprise a blind search by the interfered terminal for one or more control parameters pertaining to the at least one further terminal. In such a situation, the blind search may be performed in a parameter search space that is limited based on the a priori knowledge.

Additionally, or as an alternative, the a priori knowledge may pertain to the fact that there exists a predetermined relation between the control information pertaining to the one or more further terminals and control information pertaining to the interfered terminal. The control information pertaining to the one or more further terminals may in such a case be determined based on the control information for interfered terminal, taking into account the predetermined relation.

In one variant, the a priori knowledge relates to the fact that the control information pertaining to one or more further terminals is at least partly identical to the control information pertaining to the interfered terminal. Additionally, or as an alternative, the a priori knowledge may pertain to a subset of bits used to encode a cell-specific temporal identifier of the one or more further terminals. In this case the control information may be determined taking into account the known subset of bits.

Still further, the a priori knowledge may pertain to the fact that the one or more further terminals require a high error protection. In such a case a blind search for decoding information may be restricted to one or more of the highest aggregation levels.

The step of determining the control information pertaining to the at least one further terminal may comprise various sub-steps. Such sub-steps may include decoding multiple candidates for the interfering signal so as to obtain decoding reliability information for each signal candidate, selecting one or more of the signal candidates based on the associated decoding reliability information, and deriving for each of the selected signal candidates control information in the form of a cell-specific temporary terminal identifier as a mask pattern of an associated Cyclic Redundancy Check (CRC) code.

According to another aspect, a method of operating one or more nodes in a cellular communication network to facilitate cancelling by a potentially interfered terminal of inter-cell or intra-cell interference is provided, wherein the method comprises identifying one or more terminals for which a downlink transmission has the potential of causing interference to the potentially interfered terminal, determining control information pertaining to the one or more identified terminals, wherein the control information is exploitable by the potentially interfered terminal for at least one of decoding and re-generating an interfering signal destined to the one or more identified terminals, and sending a control channel message to the potentially interfered terminal, the control channel message including at least a part of the control information.

According to a further aspect, a method of operating one or more nodes in a cellular communication network to facilitate cancelling by a potentially interfered terminal inter-cell or intra-cell interference is provided, wherein the method comprises identifying one or more terminals for which a downlink transmission has the potential of causing interference to the potentially interfered terminal, and allocating control information to the one or more identified terminals such that there exists a predetermined relation between the control information for the one or more identified terminals and control information for the interfered terminal, so that the relation is exploitable by the potentially interfered terminal for at least one of decoding and re-generating an interfering signal destined to the one or more identified terminals.

In each of the above two method aspects, also the potentially interfered terminal may be identified as interfering terminal. Still further, in each of the above method aspects, the control information may comprise one or more of the following control parameters pertaining to the at least one interfering terminal: a cell-specific temporal identifier, a transmission mode, a transmission format, an aggregation level, and resource allocation information.

Also provided is a computer program product comprising program code portions for performing the steps of any of the methods and method aspects disclosed herein when the computer program product is run on a computing device. The computer program product may be stored on a computer readable recording medium. Moreover, the computer program product may be provided for download via a network connection.

Still further, there is provided a terminal configured to cancel inter-cell or intra-cell interference in a cellular communication network, wherein the terminal comprises an interface configured to receive a signal, wherein the received signal comprises an interfering signal destined to at least one further terminal different from the interfered terminal, a processor configured to determine control information pertaining to the at least one further terminal, a decoder configured to decode the interfering signal based on the control information so as to generate decoded information, a generator configured to re-generate the interfering signal from the decoded information based on the control information, and a canceller configured to cancel the interfering signal from the received signal based on the re-generated signal.

The terminal may be a mobile or stationary component. As an example, the terminal may take the form of a mobile telephone, smart phone, desktop or tablet computer, and so on.

Further provided is a node or node system for a cellular communication network for facilitating cancelling inter-cell or intra-cell interference by a potentially interfered terminal, wherein the node or node system comprises a processor configured to identify one or more terminals for which a downlink transmission has the potential of causing interference to the potentially interfered terminal and to determine control information pertaining the one or more identified terminals, wherein the decoding information is exploitable by the potentially interfered terminal for decoding an interfering signal destined to the one or more identified terminals. The node or node system further comprises an interface configured to send a control channel message to the potentially interfered terminal, wherein the control channel message includes at least a part of the control information.

Further provided is a node or node system for a cellular communication network to facilitate cancelling of inter-cell or intra-cell interference by a potentially interfered terminal, wherein the node or node system comprises a processor configured to identify one or more terminals for which a downlink transmission has the potential of causing interference to the potentially interfered terminal, and an allocator configured to allocate control information to the one or more identified terminals such that there exists a predetermined relation between the decoding information pertaining to the one or more identified terminals and decoding information pertaining to the interfered terminal, so that the relation is exploitable by the potentially interfered terminal for decoding an interfering signal destined to the one or more identified terminals.

The node or node system may comprise one or more of a radio base station and a radio network controller.

BRIEF DESCRIPTION OF THE DRAWINGS

Further aspects, advantages and implementations of the present disclosure will become apparent from the following description of exemplary embodiments and the drawings.

DETAILED DESCRIPTION

In the following, for purposes of explanation and not limitation, specific details are set forth in order to provide a thorough understanding of the technique presented herein. It will be apparent to those skilled in the art that the technique may be practised in other embodiments that depart from these specific details. For example, while the following embodiments will partially be described in connection with cancelling interference associated with Physical Downlink Control Channel (PDCCH) or Physical Downlink Shared Channel (PDSCH) transmissions, it will be appreciated that the present disclosure could also be applied to other transmission types. Moreover, while some of the following embodiments relate to cellular communication networks in accordance with the Long Term Evolution (LTE) standard, it will be readily apparent that the technique presented herein can also be implemented in other network types.

Those skilled in the art will further appreciate that the technique presented herein may be implemented using hardware circuits, software code, or a combination thereof. The software code may be provided in conjunction with the programmed microprocessor or a general purpose computer. Still further, the present disclosure may be implemented using one of an Application Specific Integrated Circuit (ASIC) and a Digital Signal Processor (DSP). It will be appreciated that the technique may also be embodied in a computer processor and a memory coupled to the processor, wherein the memory is encoded with software code that performs the methods and method aspects presented herein when executed by the processor.

Figure 1:
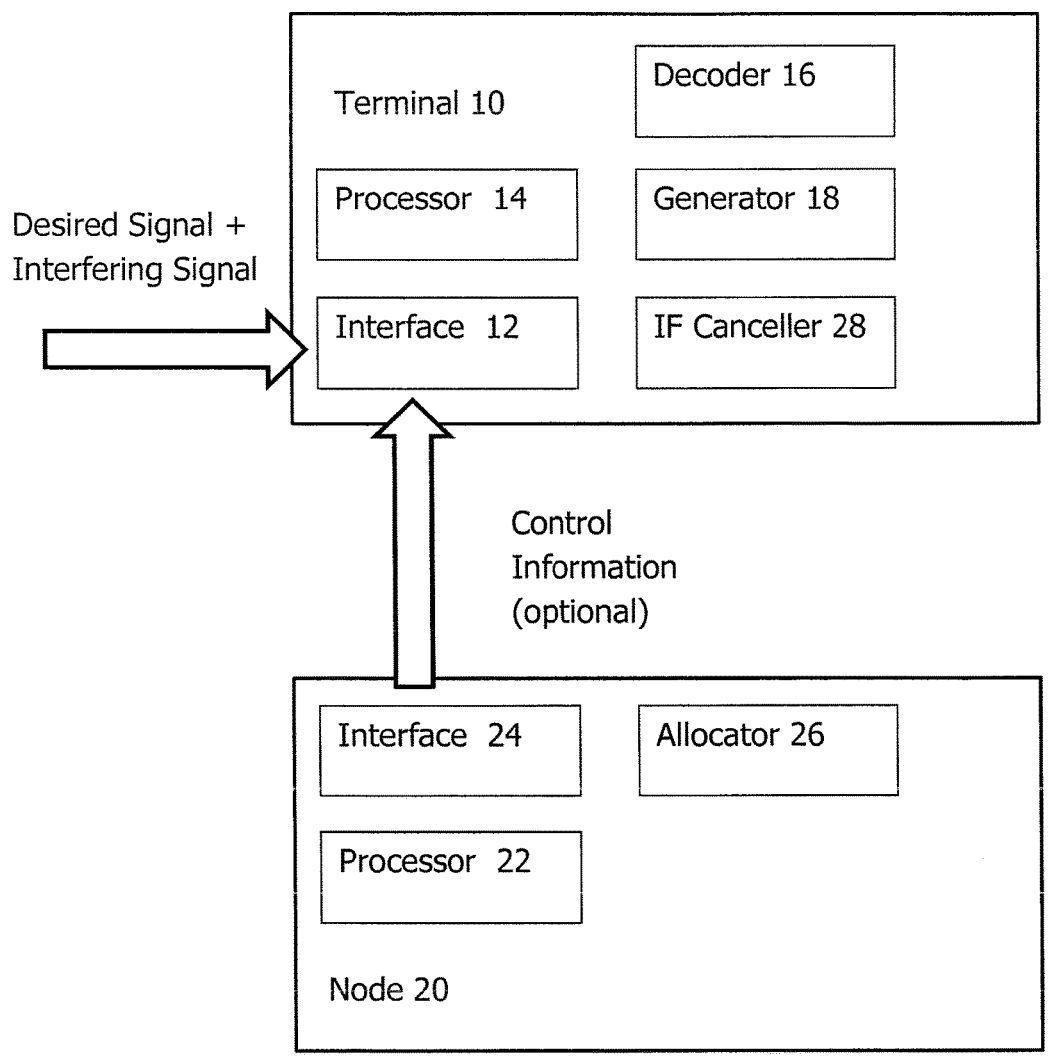
FIG. 1 schematically illustrates in a block diagram a terminal embodiment and a node embodiment.

FIG. 1 schematically shows a cellular communication network 100 in which at least one of inter-cell and intra-cell interference may potentially occur. The network 100 comprises multiple terminals (only one terminal 10 is illustrated in FIG. 1) as well as multiple network nodes (only one network node 20 is illustrated in FIG. 1).

The terminal 10 may take the form of a mobile device attachable to the cellular communication network 100 via the node 20 or any other node of the network 100. The node 20 may be realized in the form of an access network node, such as a GSM base station, a UMTS node B or an LTE eNodeB. Still further, the node 20 may be configured as UMTS or LTE Radio Network Controller (RNC). Of course, the node 20 could also be a component of an LTE Advanced or any other network.

The terminal 10 is configured to cancel inter-cell or intra-cell interference. Such interference may be caused, for example, by downlink transmissions from the node 20 or any other node of the same cell in which the terminal 10 is located, or a different (e.g., neighbouring) cell. Such a downlink transmission may be destined to a further terminal different from the interfered terminal 10. The further terminal may be located in the same cell (intra-cell interference) or in another cell (inter-cell interference).

As shown in FIG. 1, the interfered terminal 10 comprises an interface 12 configured to receive one or more signals, typically a radio signal. Any signal received via the interface 12 typically comprises a desired signal destined to the terminal 10 as well as an interfering signal destined to at least one further terminal different from the terminal 10.

The terminal 10 further comprises a processor 14 configured to determine control information pertaining to the at least one further terminal. As will be described in more detail below, the control information may be determined in various ways (e.g., autonomously by the terminal 10 or using assistance from the node 20). The control information may generally comprise one or more individual control parameters. Such control parameters may be parameters as typically signalled via a control channel (using, e.g., a control channel message).

The terminal 10 further comprises a decoder 16 configured to decode the interfering signal based on the control information so as to generate the decoded information. The control information used to decode the interfering signal may comprise one or more of a cell-specific temporal identifier, a transmission mode and a transmission format. Such control parameters will typically be included in an interfering control channel message or an interfering shared channel message. Generally, the operation of the decoder 16 may also comprise other processing operations performed at that decoding stage, such as descrambling or channel candidate selection.

A generator 18 of the terminal 10 is configured to re-generate the interfering signal (e.g., an interfering control channel or shared channel signal) based on the decoded information obtained by the decoder 16. The re-generation may occur at a baseband level.

The operation of the generator 18 is based on the control information determined by the processor 14. Corresponding control parameters may comprise one or more of a transmission format, a cell-specific temporal identifier, a transmission mode and resource allocation information. The generator 18 may be configured to perform processing operations such as encoding, scrambling and channel modulation.

The re-generated signal obtained by the generator 18 is input to an interference canceller 28. The interference canceller 28 is configured to cancel the interference signal from the received signal based on the re-generated signal. The interference canceller 28 may apply conventional interference cancellation techniques in this regard. Typically, the interference canceller will subtract the re-generated signal from the received signal so as to isolate the desired signal for further processing.

FIG. 1 further shows an embodiment of the node 20 that facilitates cancelling of inter-cell or intra-cell interference by the terminal 10. As shown in FIG. 1, the node 20 comprises a processor 22 configured to identify one or more terminals for which a downlink transmission has the potential of causing interference to the terminal 10. If the node 20 is a serving node for the terminal 10, the node 20 may also serve the one or more terminals for which the interfering downlink transmission is intended ("intra-cell interference"). Alternatively, the downlink transmission may be performed by a serving node of another cell ("inter-cell interference"). In such a situation, the processor 22 may receive corresponding downlink transmission information from the other serving node.

The processor 22 is further configured to determine control information pertaining to the one or more identified terminals. As explained above, that control information is exploitable by the terminal 10 for at least one of decoding and re-generating an interfering signal destined to the one or more terminals identified by the processor 22.

The node 20 further comprises an interface 24 configured to send a control channel message to the terminal 10. The control channel message includes at least part of the control information required by the terminal 10 in connection with decoding and/or re-generating interfering signals.

The node 20 further comprises an allocator 26 configured to allocate control information to the one or more terminals for which a downlink transmission has the potential of causing interference to the terminal 10. The control information is allocated such that there exists a predetermined relation between the control information pertaining to the one or more terminals associated with the potentially interfering downlink transmission on the one hand and control information pertaining to the potentially interfered terminal 10 on the other. This relation is exploitable by the terminal 10 for at least one of the decoding and re-generating an interfering signal destined to the terminals associated with the interfering downlink transmission.

In the embodiment of FIG. 1 the node 20 comprises both the interface 24 and the allocator 26. It will be appreciated that in alternative embodiments the node 20 may comprise only one of the interface 24 and the allocator 26.

Figure 2:
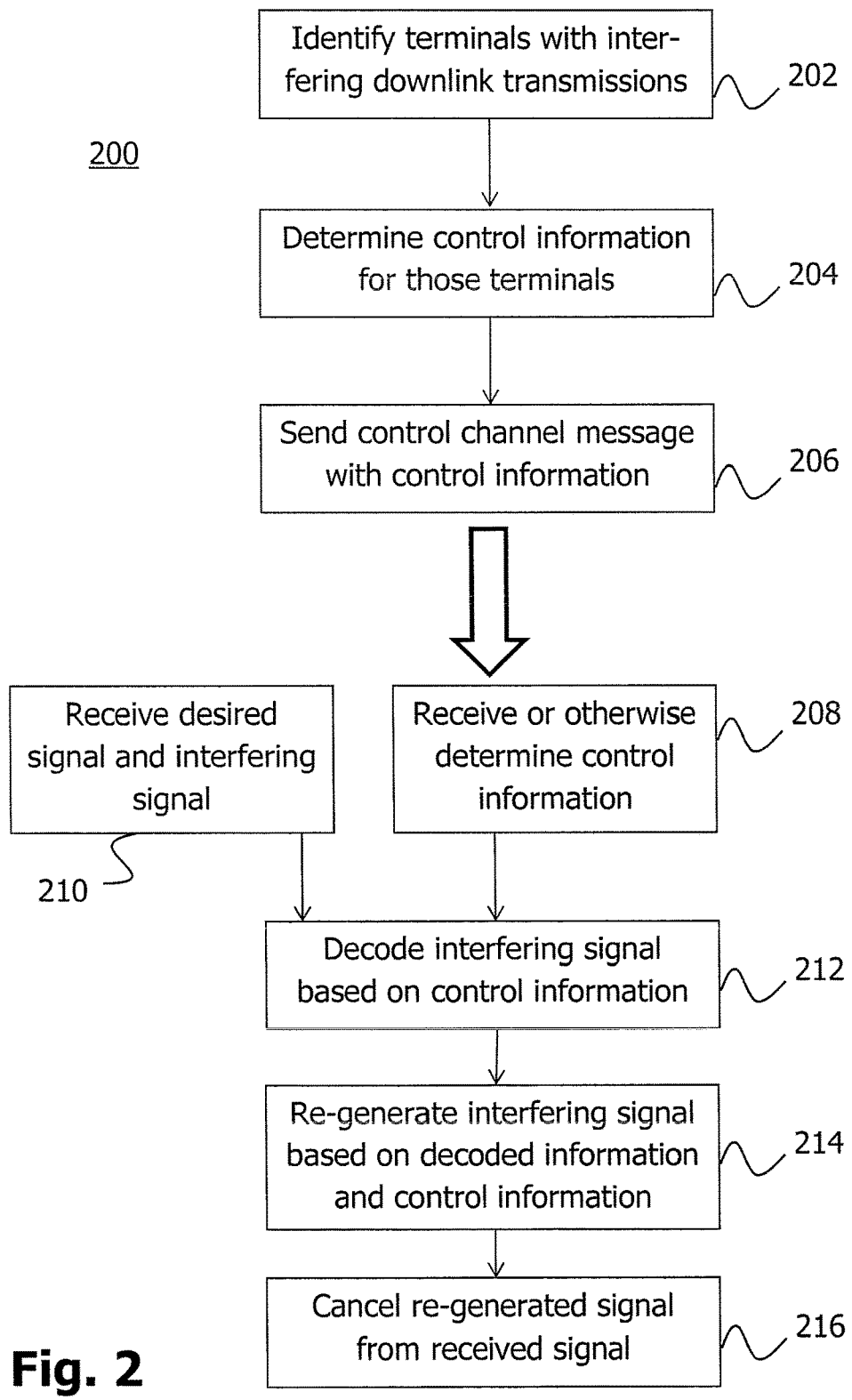
FIG. 2 shows a flow diagram illustrative of method embodiment.

FIG. 2 illustrates in a flow diagram 200 method embodiments that may be executed by the terminal 10 and the node 20. In an initial step 202, the node 20 identifies one or more terminals for which a downlink transmission has the potential of causing interference to the potentially interfered terminal 10. The identified terminals may be served by the same cell or by another cell than the terminal 10. In the latter case the identification step 202 may be based on information received from the other cell.

In a next step 204, control information pertaining to the one or more terminals identified in step 202 is determined. This control information is exploitable by the terminal 10 for at least one of decoding and re-generating an interfering signal destined to the one or more terminals identified in step 202.

In a further step 206, the control information thus determined is packed into a control channel message destined to the terminal 10. Based on the content of the control channel message, the terminal 10 is put in a position to decode and re-generate the interfering signal for interference cancellation purposes.

The control channel message is received by the terminal 10 in step 208 and permits the terminal 10 to determine the corresponding control information. Alternatively, the determination in step 208 could be based on a priori knowledge such as a predetermined relation between the control information pertaining to the terminals associated with interfering downlink transmissions on the one hand and control information pertaining to the terminal 10 on the other hand.

In a further step 210 that is performed in any temporal order relative to step 208, a signal is received by the terminal 10. The received signal comprises an interfering signal associated with the downlink transmission to one or more terminals different from terminal 10.

Then, in step 212, the interfering signal is decoded based on the control information so as to generate decoded information. In step 214, the interfering signal is re-generated from the decoded information and based on the control information. Finally, in step 216, the interfering signal is cancelled from the signal received in step 210 based on the re-generated signal (e.g., by subtraction or any other suitable interference cancellation process).

In the following, the interference cancellation strategies generally discussed above with reference to FIGS. 1 and 2 will be described in more detail. It will be appreciated that the following details may be implemented in any of the embodiments of FIGS. 1 and 2 as needed.

In cellular communication networks of the type illustrated in FIG. 1, the achievable data throughput at the cell edge is often limited by the interference from neighbor cells. In order to increase the cell-edge throughput, advanced receiver techniques have to be introduced to cancel substantial parts of the interfering signals. As discussed with reference to FIG. 2, the type of interference cancellation presented herein involves
  receiving a signal that comprises an interfering signal
  decoding the interfering signal
  re-generating the interfering signal from the decoded information
  cancelling the interfering signal from the received signal.

Key for this type of interference cancellation is to be able to decode and re-generate the interfering signal. These steps require information that may depend on the type of cellular communication network for which interference has to be cancelled. For a typical cellular communication network, among others the knowledge of one or more of the following control parameters may be required K1. resource allocation of the interfering signal
  (e.g., reference signal sequence and/or allocated sub-carriers)
K2. transmission format of the interfering signal
  (e.g., signal constellation and/or code rate)
K3. scrambling code
  (usually used to increase "randomness" of data stream)
K4. channel estimation of interfering signal
  (may require cell-specific scrambling)

The 4th and higher generation of digital mobile cellular communication networks, such as LTE, supports many physical channels and signals for the served terminals (also called User Equipment, UE, hereinafter). Those physical channels and signals can be further sub-divided into common and terminal-specific channels and signals. Among the terminal-specific channels and signals in downlink direction, the following can be mentioned
  DM-RS (Demodulation Reference Signal, also known as terminal-specific RS)
  PDCCH (Physical Downlink Control Channel)
  ePDCCH (evolved Physical Downlink Control Channel introduced in LTE Rel-11)
  PDSCH (Physical Downlink Shared Channel)

Interference cancellation of terminal-specific channels and signals in LTE (e.g., Rel. 12) networks and similar networks is complex since the knowledge of items K1 to K4 is often not readily available. Without that knowledge, decoding and re-generation of the interfering signal is computationally complex which makes interference cancellation very hard in practice.

In the embodiments below, the following techniques are described with the assumption that knowledge on items K1 to K4 above is available:
  LTE reception of terminal-specific channels (FIG. 3)
  Interference cancellation for PDSCH reception in LTE (FIG. 4)
  Interference cancellation for PDCCH reception in LTE (FIG. 5)

Figure 4:
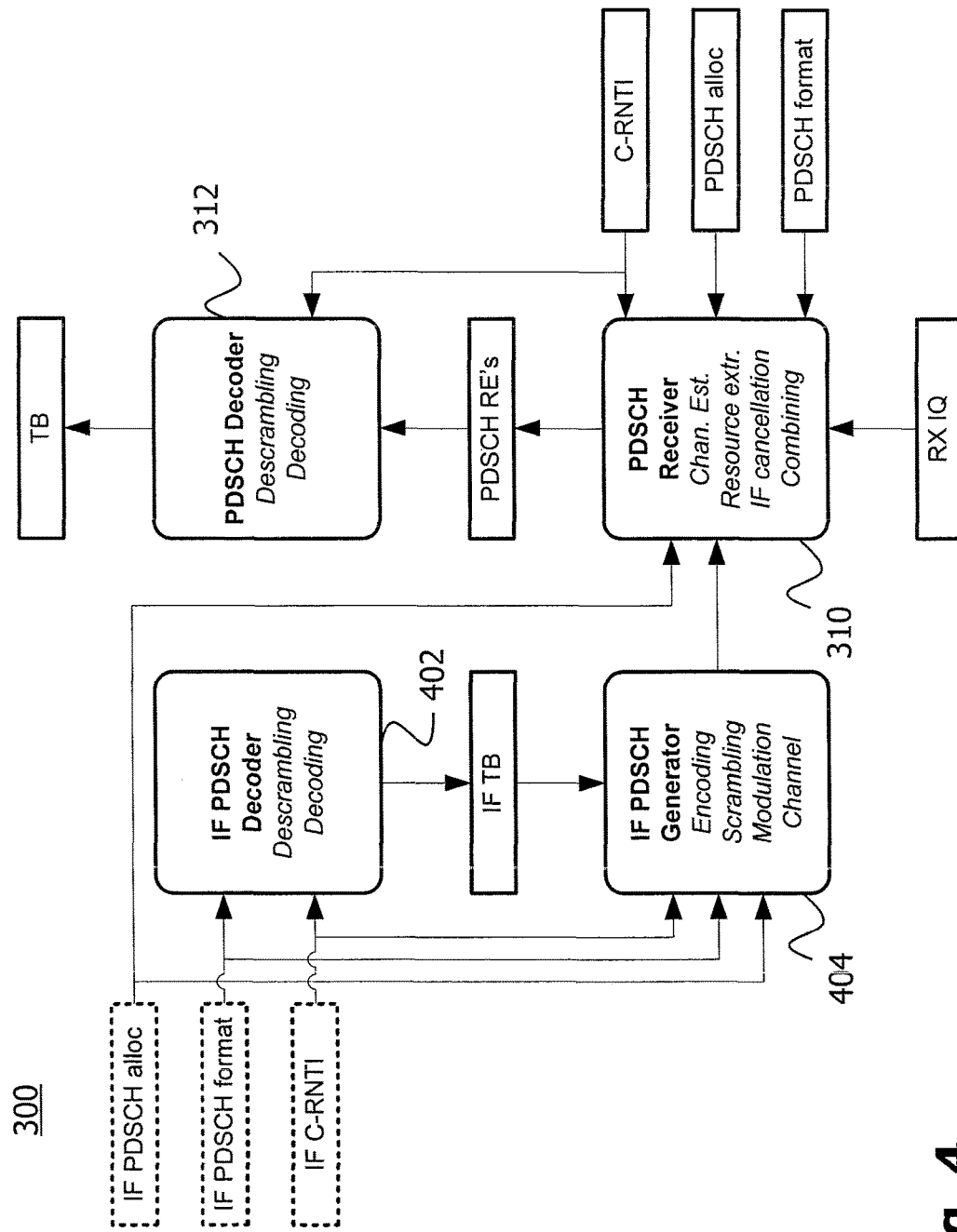
FIG. 4 shows a first implementation of interference cancellation in the receiver embodiment of FIG. 3.
Figure 5:
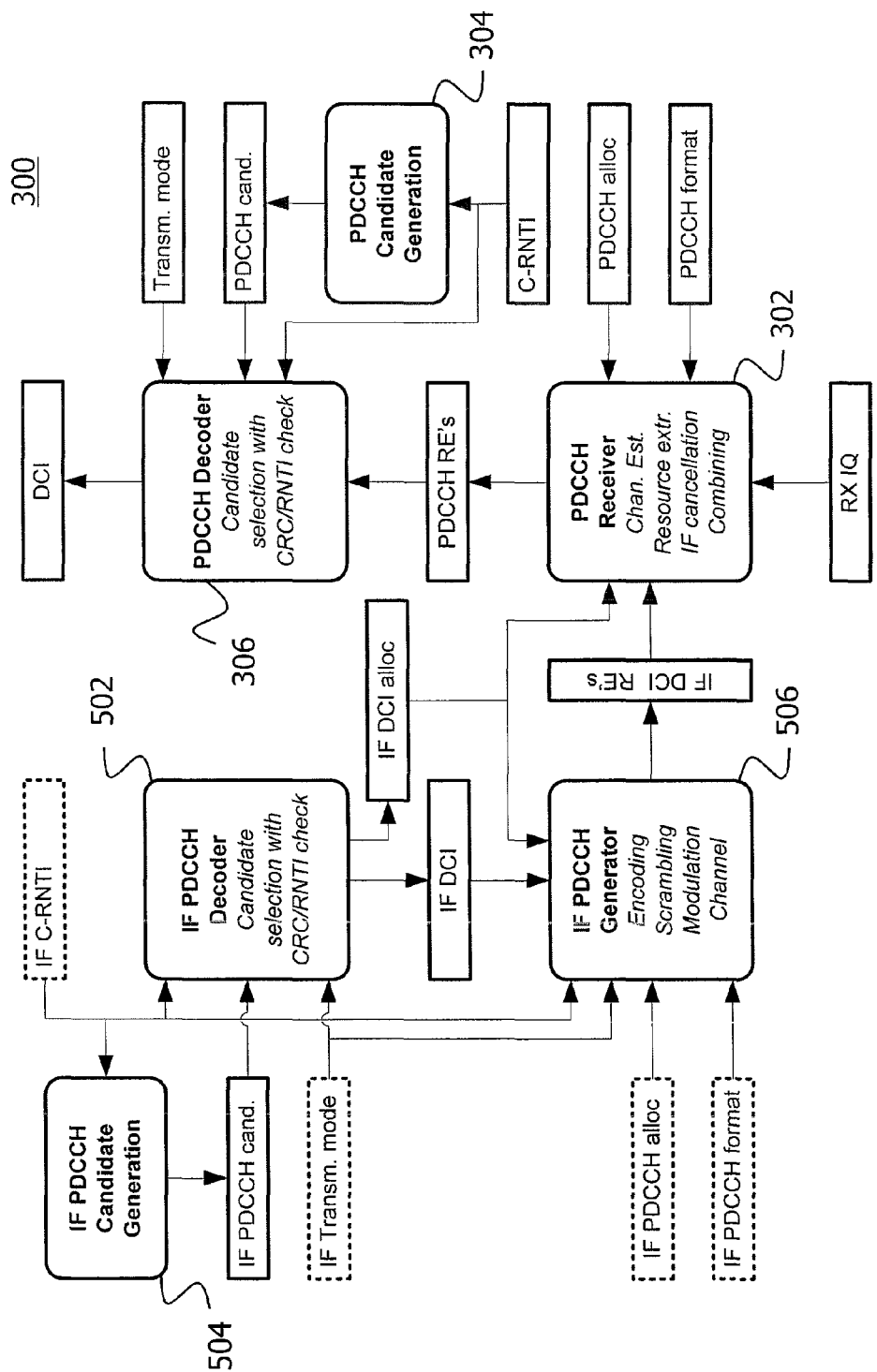
FIG. 5 shows a second implementation of interference cancellation in the receiver embodiment of FIG. 3.

This description of FIGS. 4 to 5 is the basis for more sophisticated embodiments that show how to enable interference cancellation in case knowledge on items K1 to K4 above is not inherently or fully available and still has to be derived.

Figure 3:
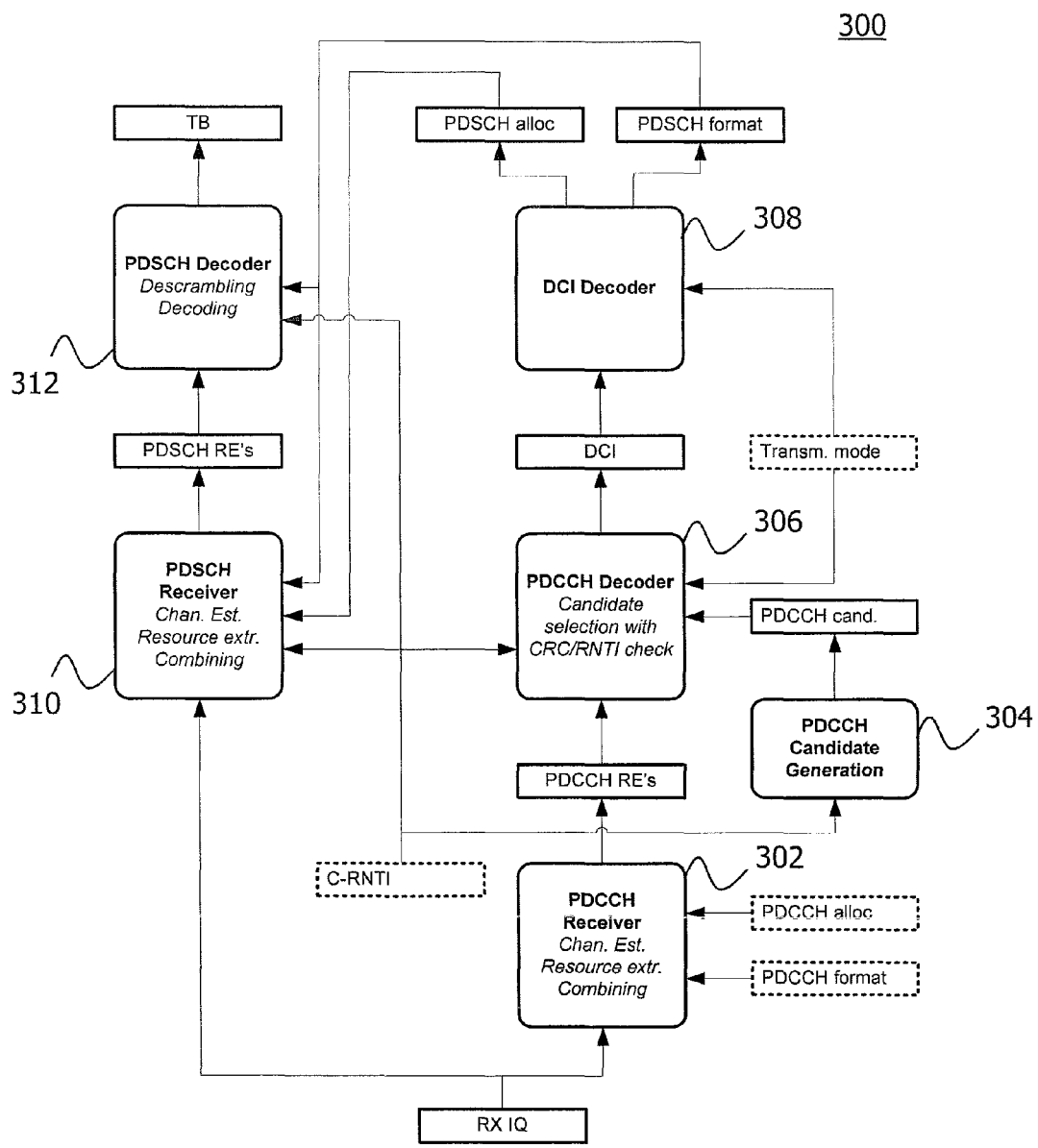
FIG. 3 shows a receiver embodiment.

Terminal-specific channel reception in LTE will now be explained with FIG. 3. FIG. 3 illustrates an embodiment of an LTE receiver 300 for terminal-specific PDCCH and PDSCH reception. The LTE receiver 300 may be incorporated in the terminal 10 of FIG. 1. Some simplifications have been adopted in FIG. 3 in order to focus on the main principles.

Initially, receiver samples are received by the LTE receiver 300 via one or more antennas, typically two or four, not illustrated in FIG. 3 (e.g., via interface 12 in FIG. 1). The receiver samples, typically baseband samples denoted as "RX IQ", are processed in a PDCCH receiver 302 (that can at least partly be implemented in the processor 14 of FIG. 1 and that may further comprise dedicated hardware components). Here, PDCCH receiver 302 is understood more general such that ePDCCH reception can also be accomplished. The PDCCH receiver 302 is configured to perform processing steps such as channel estimation, combining and Resource Element (RE) extraction.

The PDCCH receiver 302 produces combined symbols denoted as "PDCCH REs" (Resource Elements). For configuration, control parameters in the form of the PDCCH resource allocation, denoted as "PDCCH alloc", as well as the PDCCH transmission format (in particular for ePD- CCH), denoted as "PDCCH format", need to be provided (K1 and K2 in the terminology above). The PDCCH transmission format comprises the modulation scheme in use (such as QPSK) and the transmission scheme in use (such as transmit diversity). Control parameters typically not readily available for the interfering signal is marked by dashed lines in FIG. 3.

In LTE, PDCCH decoding involves a blind search over several terminal-specific PDCCH candidates generated by a dedicated PDCCH candidate generator 304. The number and location of candidates generated is limited by the so-called terminal-specific Search Space (USS). The definition of USS in turn depends on a unique identifier of the terminal 10 in the network 100, the so-called Cell-Radio Network Temporary Identifier (C-RNTI). For simplicity C-RNTI shall be understood as one exemplary representative for terminal-specific RNTIs. Other examples that may be used herein are SPS-C-RNTI and tC-RNTI.

Downstream of the PDDCH receiver 302 a PDDCH decoder 306 is arranged. The PDCCH decoder 306 attempts to decode each PDDCH candidate obtained from the PDCCH candidate generator 304. For decoding, the correct Downlink Control Information (DCI) payload size is needed which depends on the transmission mode. The validity of the decoding result is checked by means of a Cyclic Redundancy Code (CRC) and C-RNTI (since the 16-bit CRC is masked with the 16-bit C-RNTI). The final decoding result of the PDCCH decoder 306 is the DCI payload that has been successfully decoded and validated. For simplicity, a single downlink assignment is assumed for this C-RNTI carried by the PDCCH.

A DCI decoder 308 is arranged downstream of the PDDCH decoder 306. The DCI decoder 308 derives the corresponding control parameters related to the DL assignment (such as PDSCH resource allocation and PDSCH transmission format). PDSCH transmission format comprises further information like transport block size, Multiple Input Multiple Output (MIMO) transmission scheme, and modulation scheme. For proper DCI handling, it is indispensable to know the transmission mode associated with the Radio Resource Control (RRC) connection of the terminal 10.

The decoding result of the DCI decoder 308 is needed in order to feed a PDSCH receiver 310 that can at least partly be implemented in the processor 14 of FIG. 1. The PDSCH receiver 310 is arranged in parallel to the PDCCH receiver 302 and also receives the receiver samples RX IQ.

The PDSCH receiver 310 estimates the channel transfer function for the allocated resources. This estimation may be based on common or terminal-specific reference signals (DM-RS). In case of DM-RS, knowledge of C-RNTI is needed to derive the sequence of transmitted DM-RS (K4). Next, combining of received samples for allocated PDSCH resources is done. This process requires information on the PDSCH resource allocation as well as the MIMO transmission scheme (part of PDSCH format) as provided by the DCI decoder 308. Finally, the PDSCH receiver 310 extracts the PDSCH REs.

The resulting PDSCH REs output by the PDSCH receiver 310 are processed by a PDSCH decoder 312 downstream of the PDSCH receiver 310 to obtain a decoded Transport Block (TB). TB decoding requires the C-RNTI for de-scrambling of received bits (K3) as well as information on the modulation and coding scheme.

Interference cancellation for PDSCH reception in LTE will now be explained with reference to FIG. 4. FIG. 4 illustrates an implementation of the LTE receiver 300 configured for PDSCH reception with cancellation of an interfering PDSCH from, e.g., a neighboring LTE cell. Some simplifications are adopted in FIG. 4 in order to focus on the main principles. Especially, PDCCH decoding as a prerequisite for PDSCH reception is omitted here since it has already been sketched and described above with reference to FIG. 3.

The left branch in FIG. 4 shows processing of the interfering signal (e.g., as received via the interface 12 of FIG. 1). Interference signal processing steps and data names are prefixed by IF. The left branch comprises an IF PDSCH decoder 402 fed by a dedicated IF PDSCH receiver (not shown) or by the PDSCH receiver 310 (e.g., tapping that receiver 310 at a suitable signal processing point before an interference cancellation stage).

Assuming that all required control parameters, in dashed boxes, associated with the interfering signal is available (e.g., has been determined as taught herein), the interfering signal, also called interferer hereinafter, is processed and decoded like the desired signal (e.g., as explained with reference to FIGS. 1 to 3). An IF TB is decoded by the IF PDSCH decoder 402 based on the control parameters indicated in FIG. 4 to reflect the receive signal coming from the interfering PDSCH. The decoding process uses control information on resource allocation, transmission format, and C-RNTI of the interferer.

The IF TB output by the IF PDSCH decoder 402 is fed to an IF PDSCH generator 404 that additionally receives similar control information as the IF PDSCH decoder 402 on resource allocation, transmission format, and C-RNTI of the interferer. The IF PDSCH generator 402 encodes the IF TB and performs scrambling and channel modulation steps to re-generate the interfering PDSCH signal on a level that can be processed by the PDSCH receiver 310.

The PDSCH receiver 310 for the desired signal has a PDSCH interference cancellation stage. The interference cancellation stage operates on allocation information of the interferer as well as the re-generated interfering PDSCH signal as received from the IF PDSCH generator 402. Thus, the interference cancellation stage cancels the re-generated interfering PDSCH signal from the received signal (that still includes the interferer) so as to obtain the desired signal. The remaining part in the right branch for the desired signal is equal to the scenario shown in FIG. 3.

The interference cancellation stage in the PDSCH receiver 310 may follow known interference cancellation strategies. In this regard, reference is made to chapter 7 of Sergio Verdu, Multiuser Detection, Cambridge University Press, 1998.

Interference cancellation for PDCCH reception in LTE will now be explained with reference to FIG. 5. FIG. 5 illustrates an embodiment of the LTE receiver 300 configured for PDCCH reception with cancellation of interfering PDCCH signals. Again, some simplifications are adopted in FIG. 5 in order to focus on the main principles. Especially, the focus is on cancellation of one single interfering DCI. Since PDCCH may carry many DCIs, the description may be extended to apply to cancellation of more than one DCI as well.

The left branch in FIG. 5 illustrates processing of the interfering signal (e.g., as received via the interface 12 of FIG. 1). All interference signal processing steps and data names are again prefixed by IF. The left branch comprises an IF PDCCH decoder 502 fed by a dedicated IF PDCCH receiver (not shown) or by the PDCCH receiver 302 (e.g., tapping that receiver 302 at a suitable signal processing point before an interference cancellation stage).

Assuming that all required control parameters associated with the interferer is available (e.g., has been determined as taught herein), the interferer is processed and decoded very similar as in case of the desired signal (e.g., as explained with reference to FIGS. 1 to 3). For this purpose, the IF PDCCH decoder 502, an IF PDCCH candidate generator 504 as well as an IF PDCCH generator 506 are provided (see FIG. 3 above as to details of their operation). One difference is the additional output of "IF DCI alloc" information carrying the information where the decoded DCI is allocated in the IF PDCCH. The resulting IF DCI is re-generated to the level of the received signal coming from the interfering DCI. This requires information on resource allocation, transmission format, and C-RNTI of the interferer.

The PDCCH receiver 302 for the desired signal has a PDCCH interference cancellation stage. The interference cancellation stage operates on allocation information of the interferer as well as the re-generated interfering PDDCH signal as received from the IF PDCCH generator 406. Thus, the interference cancellation stage cancels the re-generated interfering PDDCH signal from the received signal (that still includes the interferer) so as to obtain the desired signal. The remaining part in the right branch for the desired signal is equal to the scenario shown in FIG. 3. The interference cancellation stage in the PDDCH receiver 302 may follow known interference cancellation strategies (see chapter 7 of Sergio Verdu, Multiuser Detection, Cambridge University Press, 1998).

It will be appreciated that the interference cancellation for PDSCH reception as shown in FIG. 4 and for PDCCH reception as shown in FIG. 5 can be combined as needed. Another realization of the LTE receiver 300 could thus comprise the processing components shown in FIG. 4 as well as the processing components shown in FIG. 5.

For the interference cancellation approaches illustrated in FIGS. 4 and 5 control information pertaining to the interference signal is required to decode and re-generate the interfering PDSCH or PDCCH signal. In FIGS. 4 and 5, that control information is indicated in dashed boxes. The LTE receiver 300 has various options for determining such control information, and those options may be combined as needed.

As a first option, the LTE receiver 300 may perform "a blind search" to determine the control information or a part thereof within a nominal search space associated with a specific control parameter. As another option, the LTE receiver 300 may receive the control information or part thereof. The control information may be received by the LTE receiver 300, when installed in the interfered terminal 10, from its serving cell (e.g., node 20 of FIG. 1). The serving cell may have determined the control information locally (e.g., in case of intra-cell interference or pre-agreements with other cells) or may have received the information from another cell (e.g., in case of inter-cell interference with no pre-agreements). The first and the second options may of course be combined, for example to enable "educated guesses". For an educated guess, the nominal search space is limited compared to a blind search by exploiting a prioiri knowledge about control information or by exploiting "coarse" control information received from the serving cell.

In the following, various embodiments will be described to provide examples for the above and other options that permit the determination of control information pertaining to interfering PDSCH and PDDCH signals destined to terminals ("interfering terminals") different than the terminal 10 hosting the LTE receiver 300. It will be appreciated that the examples may also be practiced (in an adapted form) in connection with cellular communication networks different from LTE networks (such as UMTS or LTE-Advanced networks).

In the following, network signalling extensions will be described first to support interference cancellation. The network signalling extensions may be incorporated into the applicable standard documents. In general, the network signalling extensions provide at least a portion of the control information needed by the LTE receiver 300 to re-generate the interfering signal.

Dedicated (Terminal-specific) Signaling in DCI

DCI contains the information relevant for decoding of user data. In order to enable interference cancellation of terminal-specific channels, the DCI normally transmitted to the interfered UE (see terminal 10 in FIG. 1) can be enhanced to contain control information on one or more interfering signals (see also FIGS. 3 to 5 for the meaning of this control information in the receiver flow, typically dashed boxes). Alternatively, the corresponding control information may be transmitted in a dedicated control channel message (e.g., in RRC messages).

In particular, the control information pertaining to the interfering signal (e.g., an enhanced DCI) transmitted in a control channel message may comprise one or more information elements ("control parameters") on 1) C-RNTI (IF C-RNTI) or Other RNTI of the Interferer
   Enables PDCCH candidate generation for interferer
   Enables PDCCH candidate validation of interferer within IF PDCCH decoder 502
   Enables ePDCCH channel estimation of interferer within (IF) PDCCH receiver when DM-RS is used
   Enables PDSCH channel estimation of interferer within (IF) PDSCH receiver when DM-RS is used
   Enables de-scrambling of interferer within PDSCH decoder 402

2) Transmission Mode of Interferer
   Enables PDCCH decoding for interferer
   Enables proper DCI handling within DCI decoder 502 for interferer
   Required to obtain PDSCH allocation and PDSCH format information for interferer 3) Aggregation Level of Interferer
   Reduces number of PDCCH candidates for interferer in IF PDCCH candidate generator 504.

Generally, the most effective (and thus desired) scenario is to have one dominant interferer, wherein the control parameters above and presented herein characterize this interferer. In case of multiple interferers, each control parameter has to be provided per interferer. This is a trade-off since with growing number of possible interferers, the complexity of interference cancellation grows substantially.

Common Signaling with Dedicated RNTI

Interference cancellation support by the serving cell (e.g., the node 20) for the interfered terminal 10 with limited signaling can be obtained by common signaling. For such control information signaling a dedicated RNTI (e.g., a C-RNTI) or any other dedicated information element may be used. This approach allows limiting the reading of this information only to terminals supporting interference cancellation.

Possible information elements to be included in common signaling (e.g., via a control channel message) may comprise one or more of 1) Set of ("Active") C-RNTIs of Dominant Interferers
2) Transmission Mode being Common for all Dominant Interferers
   For combating inter-cell interference this may involve information exchange between different serving cells (e.g., eNodeBs such as the node 20 and at least one further node) in order to ensure common scheduling of terminals with identical transmission mode (e.g., in the same sub-frame)

3) Aggregation Level being Common for all Dominant Interferers

For combating inter-cell interference this may involve information exchange between different serving cells (e.g., eNodeBs such as the node 20 and at least one further node) in order to ensure common scheduling of terminals with identical aggregation level (e.g., in the same sub-frame)

Search Space Concept Changes

Today, the search space specification depends on the entire C-RNTI. That means that in order to know the search space for the interferer, the entire C-RNTI of the interferer needs to be known. It is proposed here to specify the search space on a subset (e.g., some bits) of the C-RNTI only. As an example, for a regular 16 bit C-RNTI a subset of 4 bits may be specified to limit the search space.

One benefit of having only a subset of the C-RNTI for search space specification can be exploited as follows. The network 100 (e.g., the node 20 or a node to which the node 20 is attached) shall ensure that potential mutual interferers (that may include the terminal 10) always use the same C-RNTI subset. Then, by knowing the search space of the desired signal, the one of the interferer is also (partially) known (as a priori knowledge).

Another option is to include this subset of bits in the common or terminal-specific signaling (e.g., in DCI) as proposed above. Using the subset leads to less signaling effort than signaling the entire C-RNTI. Of course, the search space concept discussed above could also be used in combination with other RNTI types or other control parameters.

In the above, network signalling extensions have been described. In networks, where none of the above proposals are active, "receiver-only" approaches may be used in order to cancel terminal-specific interference. Such approaches may, for example, permit to limit the search space for control information based on a priori knowledge.

Fixed Relationship of Parameters of Interferers

Interference cancellation support of the network 100 without further explicit signaling can be obtained based on a priori knowledge of the terminal 10 in various ways. It is, for example, proposed here to require the network 100 using the same transmission mode for interferers (for a single cell, multiple cells or all cells of the network 100). Then, by knowing the transmission mode of the desired signal, the one of the interferer is also known.

As an alternative, or additionally, it is proposed to require the network 100 using the same aggregation level for interferers (for a single cell, multiple cells or all cells of the network 100). Then, by detecting the used aggregation level of the desired signal, the one of the interferer is also known.

Search Space Concept for Aggregation Levels

In an exemplary LTE scenario, the entire set of PDCCH candidates comprises up to 4 different aggregation levels. Especially for low aggregation levels, the number of candidates is high, whereas for high aggregation levels the number of candidates is fairly low.

High aggregation levels correspond to a high error protection (low code rate) of the transmitted DCI. Vice versa, low aggregation levels correspond to a lower error protection (high code rate). In classical interference scenarios, the terminal 10 is often located at the cell edge while receiving signals from the serving cell and from the neighbor cell at comparable power levels. This cell edge scenario is typically associated with low to medium channel quality and, hence, requires a high error protection.

Therefore, it is proposed to search only for high aggregation levels of the interferer in order to blindly detect its control signaling. To be more specific, one exemplary method shall use only aggregation level 8 while another method may use levels 4 and 8.

Transmission Mode

As already elaborated above, the transmission mode is key information in order to enable decoding of the interferer.

It is proposed to use the same transmission mode for the interferer as for the desired signal. The reasoning behind this is that typically the desired signal and the interferer belong to the same network 100 (but optionally to different cells). The operator of this network 100 may have a clear preference for a certain transmission mode.

PDCCH Decoding of Interfering Cell

Running the IF PDCCH decoder 502 without further information on the interferer is a tedious and very expensive task. One task is the validation of the CRC with the C-RNTI associated with the inspected DCI as long as the C-RNTI is not available.

Therefore, it is proposed to operate CRC validation without knowledge of C-RNTI. This means essentially that the CRC check can no longer be used for error detection. Decoding reliability information may be used. To be more specific, the approach comprises the following steps 1) For each PDCCH candidate, the maximum-likelihood decision (MLD) is taken. If MLD is tail-biting, the candidate is kept, otherwise it is rejected.
2) Reliability information on MLD is computed. If reliability information is beyond a certain threshold, the candidate is kept, otherwise it is rejected.
3) For all kept candidates, the C-RNTI is derived as the masking pattern of the CRC.
4) Output of PDCCH Decoder Successful candidates with associated C-RNTIs The various embodiments proposed above are applicable in a variety of use cases. In LTE (including LTE-Advanced) networks, the use cases can be further distinguished by the channel type that shall be received as follows.

PDSCH Reception

Cancellation of multi-user MIMO interferer(s)

Cancellation of PDSCH interferer(s), e.g., from neighbour cell(s)

Cancellation of ePDCCHinterferer(s), e.g., from neighbour cell(s)

ePDCCH Reception

Cancellation of multi-user MIMO interferer(s)

Cancellation of PDSCH interferer(s), e.g., from neighbour cell(s)

Cancellation of ePDCCHinterferer(s), e.g., from neighbour cell(s)

PDCCH Reception

Cancellation of PDCCH interferer(s), e.g., from neighbour cell(s)

While the technique presented herein has been described with reference to exemplary embodiments, it is to be understood that the description is for explanation purposes only. Accordingly, it is intended that the invention be limited only by the scope of the claims amended hereto.

The invention claimed is:

1. A method performed by an interfered terminal of cancelling inter-cell or intra-cell interference in a cellular communication network, the method comprising:

receiving a signal, wherein the received signal comprises an interfering signal destined to at least one further terminal different from the interfered terminal;

determining at least a part of control information that has a control parameter pertaining to the at least one further terminal based on:

control information pertaining to the interfered terminal; and a priori knowledge about a predetermined relation between the control parameter pertaining to the at least one further terminal and control information pertaining to the interfered terminal, wherein determining the control information comprises a blind search by the interfered terminal for one or more control parameters pertaining to the one or more further terminals, where the blind search is performed in a parameter search space that is limited based on the a priori knowledge;

decoding the interfering signal based on the determined control information so as to generate decoded information;

regenerating the interfering signal from the decoded information and based on the determined control information; and cancelling the interfering signal from the received signal based on the re-generated signal.

2. The method of claim 1, wherein the determining the control information comprises receiving a control channel message including at least a part of the control information.

3. The method of claim 2, wherein the control channel message is one of a Downlink Control Information (DCI) message and a Radio Resource Control (RRC) message.

4. The method of claim 2, wherein the control channel message is dedicated to the interfered terminal.

5. The method of claim 4, wherein the dedicated control channel message includes a subset of bits used to encode a cell-specific temporal identifier of the at least one further terminal; and the control information is determined taking into account the subset of bits.

6. The method of claim 2, wherein the control channel message is a common message destined to multiple terminals including the interfered terminal.

7. The method of claim 6, wherein the control channel message comprises a dedicated cell-specific temporal terminal identifier that identifies the control channel message as including at least a part of the control information.

8. The method of claim 6, wherein the common control channel message signals one or more of the following control parameters:

a set of one or more cell-specific temporary terminal identifiers;

a common transmission mode for a set of one or more terminals;

a common transmission format for a set of one or more further terminals; and a common aggregation level for a set of one or more terminals.

9. The method of claim 1, wherein the determining the control information pertaining to the at least one further terminal comprises:

decoding multiple candidates for the interfering signal so as to obtain decoding reliability information for each signal candidate;

selecting one or more of the signal candidates based on the associated decoding reliability information; and deriving for each of the selected signal candidates control information in the form of a cell specific temporary terminal identifier as a masking pattern of an associated Cyclic Redundancy Code (CRC).

10. The method of claim 1, wherein the control information corresponds to a control channel message.

11. A method performed by an interfered terminal of cancelling inter-cell or intra-cell interference in a cellular communication network, the method comprising:

receiving a signal, wherein the received signal comprises an interfering signal destined to at least one further terminal different from the interfered terminal;

determining at least a part of control information that has a control parameter pertaining to the at least one further terminal based on:

control information pertaining to the interfered terminal; and a priori knowledge about a predetermined relation between the control parameter pertaining to the at least one further terminal and control information pertaining to the interfered terminal;

decoding the interfering signal based on the determined control information so as to generate decoded information;

regenerating the interfering signal from the decoded information and based on the determined control information; and cancelling the interfering signal from the received signal based on the re-generated signal, wherein the a priori knowledge relates to the fact that the control information pertaining to the one or more further terminals is at least partially identical to the control information pertaining to the interfered terminal.

12. A method performed by an interfered terminal of cancelling inter-cell or intra-cell interference in a cellular communication network, the method comprising:

receiving a signal, wherein the received signal comprises an interfering signal destined to at least one further terminal different from the interfered terminal;

determining at least a part of control information that has a control parameter pertaining to the at least one further terminal based on:

control information pertaining to the interfered terminal; and a priori knowledge about a predetermined relation between the control parameter pertaining to the at least one further terminal and control information pertaining to the interfered terminal;

decoding the interfering signal based on the determined control information so as to generate decoded information;

regenerating the interfering signal from the decoded information and based on the determined control information; and cancelling the interfering signal from the received signal based on the re-generated signal, wherein:

the a priori knowledge pertains to a subset of bits used to encode a cell-specific temporal identifier of the one or more further terminals; and the control information is determined taking into account the known subset of bits.

13. A method performed by an interfered terminal of cancelling inter-cell or intra-cell interference in a cellular communication network, the method comprising:

receiving a signal, wherein the received signal comprises an interfering signal destined to at least one further terminal different from the interfered terminal;

determining at least a part of control information that has a control parameter pertaining to the at least one further terminal based on:

control information pertaining to the interfered terminal; and a priori knowledge about a predetermined relation between the control parameter pertaining to the at least one further terminal and control information pertaining to the interfered terminal;

decoding the interfering signal based on the determined control information so as to generate decoded information;

regenerating the interfering signal from the decoded information and based on the determined control information; and cancelling the interfering signal from the received signal based on the re-generated signal, wherein the a priori knowledge pertains to the fact that the one or more further terminals require a high error protection so that a blind search for control information is restricted to one or more of the highest aggregation levels.

14. A first terminal configured to cancel inter-cell or intra-cell interference in a cellular communication network, the first terminal comprising: an interface configured to receive a signal, wherein the received signal comprises an interfering signal destined to at least one further terminal different from the interfered terminal;

a processor configured to determine at least a part of control information that has a control parameter pertaining to the at least one further terminal based on: control information pertaining to the first terminal; and a priori knowledge about a predetermined relation between the control parameter pertaining to the at least one further terminal and control information pertaining to the first terminal; a decoder circuit configured to decode the interfering signal based on the determined control information so as to generate decoded information; a generator circuit configured to re-generate the interfering signal from the decoded information based on the determined control information; and a canceller circuit configured to cancel the interfering signal from the received signal based on the re-generated signal;

wherein the processor is configured to determine the control information taking into account a known subset of bits pertaining to a subset of bits used to encode a cell-specific temporal identifier of the at least one further terminal.

* * * * *